United States Patent
Rausch

(10) Patent No.: US 8,369,268 B2
(45) Date of Patent: Feb. 5, 2013

(54) MULTIPLE DEVICE TO ONE-ANTENNA COMBINING CIRCUIT AND METHODS OF USING SAME

(75) Inventor: Walter F. Rausch, Shawnee, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 734 days.

(21) Appl. No.: 12/614,010

(22) Filed: Nov. 6, 2009

(65) Prior Publication Data

US 2011/0110277 A1    May 12, 2011

(51) Int. Cl.
    *H04W 4/00* (2009.01)
(52) U.S. Cl. ........ 370/328; 370/380; 370/381; 370/473; 370/470; 455/13.3; 455/18; 455/82; 455/83; 455/562.1; 455/121; 455/193.1
(58) Field of Classification Search .......... 370/328, 370/380, 381, 473, 470, 474, 472, 476; 455/91, 455/95, 102, 103, 126, 129, 424, 425, 456.5, 455/456.6, 13.3, 13.4, 17, 522, 69, 70, 67.14, 455/561, 562.1, 115.1, 115.2, 550.1, 575.1, 455/67.11, 67.13, 114.2
See application file for complete search history.

(56) References Cited

U.S. PATENT DOCUMENTS

| | | | | |
|---|---|---|---|---|
| 5,652,765 | A * | 7/1997 | Adachi et al. | 375/211 |
| 8,014,718 | B2 * | 9/2011 | Bassiri et al. | 455/11.1 |
| 2006/0014491 | A1 * | 1/2006 | Cleveland | 455/17 |
| 2008/0194214 | A1 * | 8/2008 | Wolfsberger | 455/78 |
| 2009/0108954 | A1 * | 4/2009 | Cheung et al. | 333/1.1 |
| 2009/0213768 | A1 * | 8/2009 | Jeong et al. | 370/280 |
| 2009/0239521 | A1 * | 9/2009 | Mohebbi | 455/422.1 |
| 2011/0292863 | A1 * | 12/2011 | Braz et al. | 370/315 |

* cited by examiner

*Primary Examiner* — Kibrom T Hailu
*Assistant Examiner* — Zewdu A Beyen
(74) *Attorney, Agent, or Firm* — Winston & Strawn LLP

(57) ABSTRACT

A multiple device to one-antenna combining circuit for transferring wireless communication signals from a first and second wireless communication device connected to a donor antenna is described. The circuit comprises a first single-stage circulator configured to be coupled to a transmission-reception path of the first wireless communications device; a two-stage circulator coupled to the first single-stage circulator and configured to be coupled a transmission-reception path of the second wireless communications device; a two-way splitter coupled to the two-stage circulator and configured to be coupled a transmission-reception path of the donor antenna; and a second single-stage circulator coupled between the two-way splitter and the first single stage circulator. The wireless transmissions of the first wireless communications device travel from the first signal stage circulator to the two-stage circulator to the two-way splitter to the donor antenna. The first wireless device can be a repeater. The second wireless device can be a telemetry radio. Methods of using the circuit are also provided.

27 Claims, 1 Drawing Sheet

MULTIPLE DEVICE TO ONE-ANTENNA COMBINING CIRCUIT AND METHODS OF USING SAME

FIELD

The present invention generally relates to a circuit for use in mobile communication and broadcast systems and more particularly to a multiple device to one-antenna combining circuit that couples a radio frequency repeater to a telemetry radio and allows remote supervision of that repeater, which supervision is independent of the proper operation of the repeater itself.

BACKGROUND

Mobile communication systems are provided with a mobile switching center (MSC), a base station controller (BSC), a base transceiver station (BTS), a mobile station (MS), and the like. A communication possible area can be extended where multiple BTS units are installed. However, when a signal transmitted from the BTS is propagated over air, the signal may be weakened. Since signal strength may be further weakened due to natural and artificial obstacles such as a mountain, a building, a building underground, a tunnel, the inside of a building, and the like, there may occur a partial communication shadow zone where smooth reception of the MS is impossible. In mobile communication and broadcast networks, repeaters are widely used for coverage extension and electronic wave shadow zone reduction. A radio frequency (RF) repeater is cheaper since signals are communicated between it and a base station without having to construct a special transmission line.

In telecommunications, circuit 100 of FIG. 1 is currently used to attach a telemetry radio 106 to an in-building repeater 104 requires that repeater 104 be fully operational to transmit telemetry data to a System Operations Center (SoC). Repeater 104 transmits-receives signals from a base station over a donor antenna 102. Repeater 104 transmits-receives signals to mobile stations by coupling to tee-junction 110 and then to service antenna 100. Telemetry radio 106 transmits-receives from donor antenna 102 over tee-junction 110 and through repeater 104. As such, the wireless communication path of telemetry radio 106 traverses repeater 104. Data connection 114 can be a hardwired network link, for example, an Ethernet link. When repeater 104 fails or becomes impaired, a loss of communication with telemetry radio 106 is the only indication of this failure to the SoC. As such, the traditional repeater circuit fails to communicate impairment in a repeater's Operations, Administration, Maintenance & Provisioning (OAM&P) link. As such, personnel must be dispatched to service the unit. A different approach to communicating with the telemetry radio is needed.

The teachings have some resemblance to the "hybrid combining" technique known in the art. However, hybrid combining can have much more loss than the present teachings. In a hybrid combiner, multiple inputs can cause interference among one another on the output. In the present configuration, a donor base station treats the first wireless device and the second wireless device, e.g., a repeater and a telemetry radio, as separate units, assigning them unique, non-colliding frequencies

SUMMARY

According to various embodiments, a multiple device to one-antenna combining circuit for transferring wireless communication signals from a first and second wireless communication device connected to a donor antenna is described. The circuit comprises: a first single-stage circulator configured to be coupled to a transmission-reception path of the first wireless communications device; a two-stage circulator coupled to the first single-stage circulator and configured to be coupled a transmission-reception path of the second wireless communications device; a two-way splitter coupled to the two-stage circulator and configured to be coupled a transmission-reception path of the donor antenna; and a second single-stage circulator coupled between the two-way splitter and the first single stage circulator. The wireless transmissions of the first wireless communications device is routed from the first signal stage circulator to the two-stage circulator to the two-way splitter to the donor antenna.

According to various embodiments, wireless transmissions of the second wireless device can be routed from the two-stage circulator to the second single-stage circulator to the two-way splitter to the donor antenna.

According to various embodiments, wireless reception at the donor antenna can be routed from the two-way splitter to the second single stage to the first single stage circulator to the first wireless communications device.

According to various embodiments, wireless reception at the donor antenna can be routed from two-way splitter to the two stage circulator to the second wireless communications device.

According to various embodiments, a tuned line can be disposed between the two-stage circulator and the second single-stage circulator. In some embodiments, a tuned line can be disposed between the first single-stage circulator and the second single-stage circulator.

According to various embodiments, the first wireless communications device can be a repeater. The second wireless communications device can be a telemetry radio.

In some embodiments, the first wireless communications device can have a second transmission-reception path that is coupled to a service antenna.

According to various embodiments, there is a data link configured to provide an OAM&P path between the first and the second wireless communications devices.

According to various embodiments, there is a SoC configured to wirelessly communicate with the donor antenna in order to remotely monitor and control one or both of the first and the second wireless communications devices.

According to various embodiments, the first and the second wireless communications devices are time-division duplex (TDD) devices.

According to various embodiments, the first and the second wireless communications devices are frequency-division duplex (FDD) devices, and a duplexer is disposed in the transmission-reception path of each of the first and the second wireless communications devices.

According to various embodiments, the first and the second wireless communications devices use the same wireless data communications network.

According to various embodiments, wherein the first and the second wireless communications devices comprise a base station each and each base station is configured to operate on different channels while transmitting-receiving over the donor antenna.

According to various embodiments, a repeater station comprising a donor antenna, a repeater, a telemetry radio and a service antenna for transferring wireless communication signals from a base station to mobile wireless devices is described. The repeater station comprises: a first single-stage circulator configured to be coupled to a transmission-reception path of the repeater; a two-stage circulator coupled to the first single-stage circulator and a transmission-reception path of the telemetry radio; a two-way splitter coupled to the two-stage circulator and configured to be coupled a transmission-reception path of the donor antenna; and a second single-stage circulator coupled between the two-way splitter and the first single stage circulator. The wireless transmissions of the repeater travel from the first single stage circulator to the two-stage circulator to the two-way splitter to the donor antenna.

According to various embodiments, there is a data link configured to provide an OAM&P path between the telemetry radio and the repeater.

According to various embodiments, the telemetry radio remotely monitors and controls the repeater.

According to various embodiments, there is a tuned line disposed between the two-stage circulator and the second single-stage circulator.

According to various embodiments, there is a tuned line disposed between the first single-stage circulator and the second single-stage circulator.

According to various embodiments, the first and the second wireless communications devices use the WiMAX wireless data communications network.

According to various embodiments, a method for transferring wireless communication signals from a first and second wireless communication device connected to a donor antenna is described. The method comprises: providing a multiple device to one-antenna combining circuit comprising a first single-stage circulator configured to be coupled to a transmission-reception path of the first wireless communications device, a two-stage circulator coupled to the first single-stage circulator and configured to be coupled a transmission-reception path of the second wireless communications device, a two-way splitter coupled to the two-stage circulator and configured to be coupled a transmission-reception path of the donor antenna, and a second single-stage circulator coupled between the two-way splitter and the first single stage circulator; and transmitting wireless transmissions from the first wireless communications device by routing a signal to the first signal stage circulator to the two-stage circulator to the two-way splitter to the donor antenna.

According to various embodiments, the method further comprises receiving wireless transmissions at the first wireless device by routing a signal from the donor antenna to the two-way splitter to the second single stage circulator to the first single stage circulator to the first wireless communications device.

According to various embodiments, the method further comprises transmitting wireless transmissions from the second wireless communications device by routing a signal to the two-stage circulator to the second single-stage circulator to the two-way splitter to the donor antenna.

According to various embodiments, the method further comprises receiving wireless transmissions at the second wireless device by routing a signal from the donor antenna to the two-way splitter to the two stage circulator to the second wireless communications device.

According to various embodiments, the method further comprises: pre-tuning an RF feedline between the two-stage circulator and the second single-stage circulator; and pre-tuning a second RF feedline disposed between the first single-stage circulator and the second single-stage circulator.

According to various embodiments, the first wireless communications device can comprise a second transmission-reception path that is coupled to a service antenna.

According to various embodiments, the method further comprises performing OAM&P between the first and the second wireless communications devices.

According to various embodiments, the first and the second wireless communications devices can use the same wireless data communications network.

According to various embodiments, the first and the second wireless communications devices can comprise a base station each, and each base station is configured to operate on different channels while transmitting-receiving over the donor antenna.

BRIEF DESCRIPTION OF THE DRAWINGS

The same reference number represents the same element on all drawings. It should be noted that the drawings are not necessarily to scale. The foregoing and other objects, aspects, and advantages are better understood from the following detailed description of a preferred embodiment of the invention with reference to the drawings, in which.

DETAILED DESCRIPTION

The repeater can be a pass-through repeater, i.e., the service antenna operates on the same frequency/channel as the donor antenna. The repeater can be a translating repeater, i.e., the service antenna operates on a frequency/channel different from the donor antenna. In some embodiments, the repeater can be a digital repeater that may store and forward wireless signals.

Methods and systems that allow a telemetry radio to utilize a repeater's outdoor or donor antenna to communicate directly back to the SoC are described. As such, this innovation allows remote supervision of a repeater that is independent of the proper operation of the repeater itself. This is particularly desirable when the telemetry radio and the repeater utilize the same wireless communications network, for example, both the telemetry radio and service offered by the repeater are based on cellular technologies, for example, WiMAX, PCS, or LTE.

The utilization of the same wireless communications network for the two radios can provide considerable cost savings both in building and operating costs. By allowing an OAM&P or telemetry radio to use the same antenna as the repeater system, the need for a second antenna and feedline to the repeater site is eliminated. This saves money in capital equipment. For example, only one donor antenna need be provided, and there is no need to provide landline communications for OAM&P to a repeater station. This can lower both capital and monthly recurring costs.

Significant cost savings in operational or monthly recurring costs can also be realized. For example, when using the carrier's own network for telemetry communications, a carrier does not incur any additional costs for telemetry communications between a SoC and a repeater station. In some operational situations, by using one donor antenna a carrier only needs to pay leasing costs for one donor antenna. Moreover, if the repeater should cease operating, the SoC can use a telemetry radio link to determine what went wrong, and possibly even restore service without dispatching personnel to the site. For example, the telemetry radio could command the operating system of the repeater to do a system "reboot" of the repeater in an attempt to re-establish wireless service at the repeater station. The telemetry data can comprise a data radio's OAM&P signal.

Figure 1:
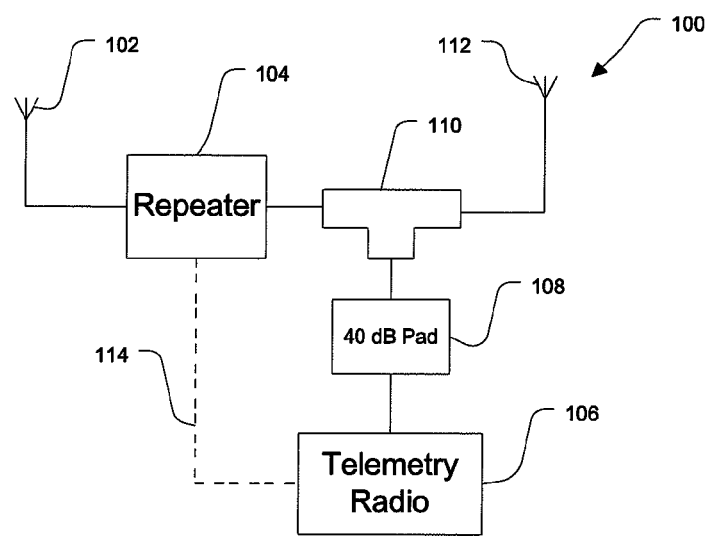
FIG. 1 is an illustration of a prior art repeating station.
Figure 2:
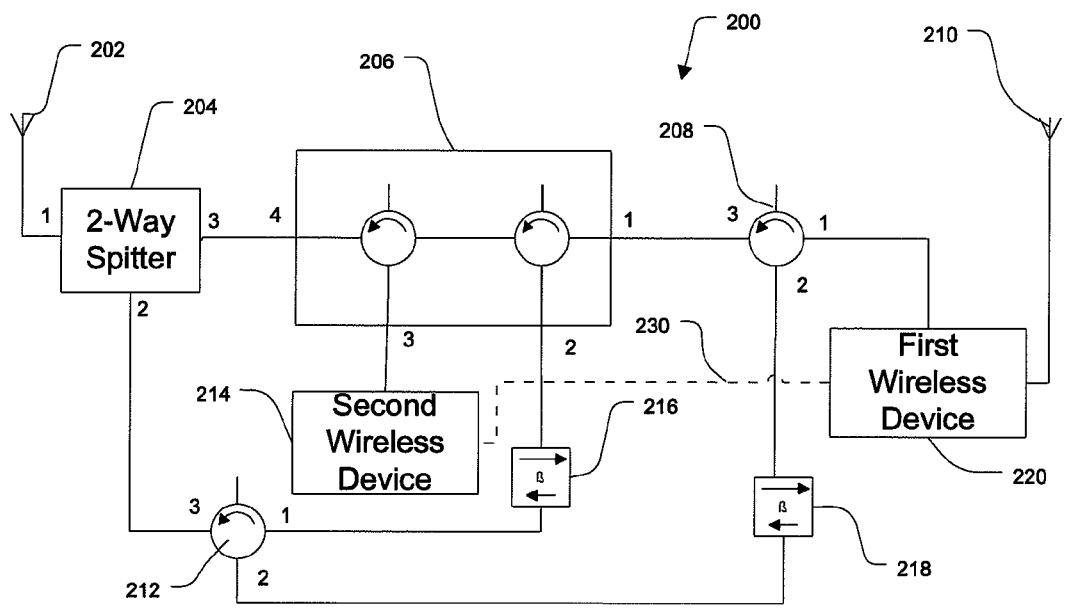
FIG. 2 is an illustration of one embodiment of a multiple device to one-antenna combining circuit.

A multiple device to one-antenna 200 can be built as illustrated in FIG. 2. In FIG. 2, the solid lines are used to illustrate RF feedlines that interconnect or couple the components that comprise the circuit.

For receiving a wireless signal at second wireless device 214, a downlink (D/L) signal from a donor base station is routed from the donor (outside) antenna 202 via RF feedline to port 1 of two way splitter or power divider 204 where it branches into two paths. One path exits from port 3 of two way power divider 204 and enters port 4 of two stage circulator 206. This D/L signal then exits two stage circulator 206 via port 3 and enters second wireless device 214 where it is then received.

For second wireless device 214 wireless radio transmit, an uplink (U/L) signal from second wireless device 214 enters two stage circulator 206 at port 3 and exits at port 2. The signal enters phase shifter or tuned line 216 and is routed to port 1 of single stage circulator 212. The U/L signal exits single stage circulator (a) at port 3 and enters port 2 of the two way power divider. Half of the U/L signal exits two way power divider 204 at port 1 and is radiated toward the donor base station by donor antenna 202. The other half of the U/L signal exits two way power divider 204 at port 3 and enters two stage circulator 206 at port 4. This signal exits two stage circulator 206 at port 3 and enters second wireless device 214. To reduce heating from this or any other extraneous RF signal entering second wireless device 214, phase shifter 216 can be adjusted to position a nodal point at second wireless device 214's transmitter Power Amplifier. In this way, the excess RF can appear as a standing wave on the feedline and be dissipated as heat in the cables and circulators.

For first wireless device 220 "receive" signal (forward link), the D/L signal from a donor base station is routed from donor antenna 202 via an RF feedline to port 1 of the two way power divider 204 where the RF branches into two paths. One path exits from port 2 of the two way power divider 204 and enters port 3 of single stage circulator 212. This D/L signal then exits single stage circulator 212 via port 2 and passes through manual phase shifter 218, from where it then enters port 2 of single stage circulator 208. The D/L signal exits single stage circulator 208 via port 1 and is routed to first wireless device 220 where it can then be amplified and re-radiated by a service antenna 210, possibly indoors.

For first wireless device 220 "transmit" signal (reverse link), the U/L signal from first wireless device 220 enters port 1 of single stage circulator 208 and exits port 3. This U/L signal is routed to port 1 of two stage circulator 208 and exits at port 4. The U/L signal then enters port 3 of two way power divider 204 where it branches into two paths. Half of the U/L signal exits two way power divider 204 at port 1 and is radiated toward the donor base station by donor antenna 202. The other half of the U/L signal exits two way power divider 204 at port 2 and enters port 3 of single stage circulator 212. This signal exits single stage circulator 212 at port 2 and passes through phase shifter 218 on its way to port 2 of single stage circulator 208. The U/L signal exits single stage circulator 208 via port 1 and enters first wireless device 220. To reduce heating from this or any extraneous RF that is entering first wireless device 220, phase shifter 218 can be adjusted to position a nodal point at first wireless device 220's transmitter Power Amplifier. In this way, the excess RF can appear as a standing wave on the feedline and be dissipated as heat in the cables and circulators.

In some embodiments, multiple device to one-antenna combining circuit 200 can be incorporated by the manufacturer in a repeater, e.g., a WiMAX In-building Repeater from Juni, Ritron, GST or others. This can result in these repeater products being able to report their status regardless of a failure condition with the repeater portion of the unit. Alternately, this circuit can be custom assembled in a laboratory or by a contract house.

In some embodiments, multiple device to one-antenna combining circuit 200 can be can be deployed at a repeater station.

As this circuit is passive, it operates correctly when used with Time Division Duplex (TDD) networks or technologies like WiMAX. With TDD the first and second wireless devices receive at the same time. Conversely, in TDD, the first and second wireless devices transmit at the same time. As such, RF being generated by the first wireless device does not get fed into the second wireless device receiver, as it is transmitting at the same time. Likewise, RF being generated by the second wireless device does not get fed into the first wireless device receiver, as it is transmitting at the same time.

As this circuit is passive, it operates correctly when used with Frequency Division Duplex (FDD) networks or technologies like PCS and LTE. The FDD devices incorporate a duplexer. The duplexer can ensure that transmissions of one wireless device on the multiple device to one-antenna combining circuit are not coupled into the receiver of the other wireless device on the multiple device to one-antenna combining circuit.

The teachings can be deployed in a variety of locations and over a variety of frequencies. As such, in some embodiments, mechanically adjustable phase shifters, illustrated in FIG. 2 as reference numbers 216 and 218, can be utilized. Moreover, the phase shifters can optionally be deployed in series with jumpers (not shown). As such, the circuit can be "pre-tuned" prior to deployment. This can, for example, ensure the best frequency match. This "pre-tuning" can lower the reflected RF power at both the first and second wireless device, e.g., a repeater and a telemetry/data radio. When the circuit is incorporated into a product that is frequency agile, for example, an In-building WiMAX Repeater, electrical phase shifters can be substituted for the manual or mechanically adjustable phase shifters. In some embodiments, the electrical phase shifters can be placed under local microprocessor control. As such, the electrical phase shifters can be automatically adjusted via frequency input, reflected power measurement or both. In some embodiments, the phase shifters can be implemented with a tuned line.

According to various embodiments, the first and second wireless devices can comprise devices with parasitic management radios. According to various embodiments, the first wireless device can comprise a repeater. In some embodiments, the second wireless device can comprise a data or telemetry radio.

According to various embodiments, this circuit can be used to combine adjacent channel base stations in a method similar to hybrid combining in FDD systems. With this circuit, two adjacent channel transmitters, for example, can share the same antenna without invasive connections being made within the stations themselves. In this embodiment, both the first and second wireless devices comprise a conventional base station, for example, WiMAX base station. In some embodiments, no service antenna is deployed for this configuration.

In some embodiments, a circulator can be a passive waveguide junction of three or more arms in which the arms can be listed in such an order that when power is fed into any arm it is transferred to the next arm on the list, in the direction indicated by an arrow that is usually physically stamped on the unit. In some embodiments, the circulator can be magnetic. Circulators are commonly available from a variety of commercial microwave equipment providers.

In operation, proper phasing characteristics of the two phase shifters may need to be tuned for each deployment. Applying the appropriate length of cable, or using a phase shifter in conjunction with jumpers, can improve the Reflected Power at both the first and second wireless devices and allow the system to operate at peak efficiency.

Optionally, a data link 230 can couple first wireless device 220 with second wireless device 214. As such, OAM&P services from one wireless device to the other wireless device can be provided even when one of the wireless devices fails. In some embodiments, data link 230 can be a hardwired network link, for example, an Ethernet link. New short range wireless links, e.g., Wi-Fi, can sometimes be used to provide the data link between the two wireless devices. However, care needs to be taken to ensure that the data link wireless technology does not interfere with the wireless communications network used by first and second wireless devices.

In some embodiments, first wireless device 220 comprises a repeater and second wireless device 214 comprises a telemetry or data radio.

In some embodiments, an insertion loss of approximately 4 dB, as compared to the traditional circuit may occur. A higher gain backhaul antenna can be used to remedy the insertion loss. In some embodiments, when a repeater is close enough to its donor station, a higher gain backhaul antenna may not be necessary as a 4 dB increase in insertion loss may not result in loss of link.

The various embodiments described above are provided by way of illustration only and should not be construed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

What is claimed is:

1. A circuit that connects first and second wireless communications devices to a donor antenna for wireless communications, the circuit comprising:
   a first single-stage circulator coupled to a transmission-reception path of the first wireless communications device;
   a two-stage circulator coupled to the first single-stage circulator and to a transmission-reception path of the second wireless communications device;
   a two-way splitter coupled to the two-stage circulator and to a transmission-reception path of the donor antenna; and
   a second single-stage circulator coupled between the two-way splitter and the first single-stage circulator,
   wherein wireless transmissions of the first wireless communications device travel from the first single-stage circulator to the two-stage circulator to the two-way splitter to the donor antenna and wireless transmissions of the second wireless device travel from the two-stage circulator to the second single-stage circulator to the two-way splitter to the donor antenna, and wherein, wireless reception at the donor antenna are routed from the two-way splitter.

2. The circuit of claim 1, wherein the wireless reception at the donor antenna travels from the two-way splitter to the two-stage circulator to the second wireless communications device.

3. The circuit of claim 1, further comprising a tuned line disposed between the two-stage circulator and the second single-stage circulator.

4. The circuit of claim 1, further comprising a tuned line disposed between the first single-stage circulator and the second single-stage circulator.

5. The circuit of claim 1, wherein the first wireless communications device comprises a repeater.

6. The circuit of claim 1, wherein the second wireless communications device comprises a telemetry radio.

7. The circuit of claim 1, wherein the first wireless communications device comprises a second transmission-reception path that is coupled to a service antenna.

8. The circuit of claim 1, further comprising a data link configured to provide an Operations, Administration, Maintenance & Provisioning (OAM&P) path between the first and the second wireless communications devices.

9. The circuit of claim 8, further comprising a System Operations Center (SoC) configured to wirelessly communicate with the donor antenna in order to remotely monitor and control one or both of the first and the second wireless communications devices.

10. The circuit of claim 1, wherein the first and the second wireless communications devices are time-division duplex (TDD) devices.

11. The circuit of claim 1, wherein the first and the second wireless communications devices are frequency-division duplex (FDD) devices, and a duplexer is disposed in the transmission-reception path of each of the first and the second wireless communications devices.

12. The circuit of claim 1, wherein the first and the second wireless communications devices use the same wireless data communications network.

13. The circuit of claim 1, wherein the first and the second wireless communications devices comprise a base station each, and each base station is configured to operate on different channels while transmitting-receiving over the donor antenna.

14. A repeater station comprising a donor antenna, a repeater, a telemetry radio and a service antenna for transferring wireless communication signals from a base station to mobile wireless devices, the repeater station comprising:
   a first single-stage circulator coupled to a transmission-reception path of the repeater;
   a two-stage circulator coupled to the first single-stage circulator and a transmission-reception path of the telemetry radio;
   a two-way splitter coupled to the two-stage circulator and to a transmission-reception path of the donor antenna
   a second single-stage circulator coupled between the two-way splitter and the first single-stage circulator;
   wherein wireless transmissions of the repeater travel from the first single-stage circulator to the two-stage circulator to the two-way splitter to the donor antenna and wireless transmissions of the telemetry radio travel from the two-stage circulator to the second single-stage circulator to the two-way splitter to the donor antenna, and wherein, wireless reception at the donor antenna are routed from the two-way splitter.

15. The repeater station of claim 14, further comprising a data link configured to provide an Operations, Administration, Maintenance & Provisioning (OAM&P) path between the telemetry radio and the repeater.

16. The repeater station of claim 15, wherein the telemetry radio remotely monitors and controls the repeater.

17. The repeater station of claim 14, further comprising a tuned line disposed between the two-stage circulator and the second single-stage circulator.

18. The repeater station of claim 14, further comprising a tuned line disposed between the first single-stage circulator and the second single-stage circulator.

19. The repeater station of claim 14, wherein the first and the second wireless communications devices use a WiMAX wireless data communications network.

20. A method for wireless communications, the method comprising:
 connecting first and second communications devices to a donor antenna utilizing a circuit, wherein the circuit comprises:
  a first single-stage circulator coupled to a transmission-reception path of the first wireless communications device;
  a two-stage circulator coupled to the first single-stage circulator and to a transmission-reception path of the second wireless communications device;
  a two-way splitter coupled to the two-stage circulator and to a transmission-reception path of the donor antenna; and
  a second single-stage circulator coupled between the two-way splitter and the first single-stage circulator;
 transmitting wireless transmissions from the first wireless communications device by routing a signal to the first signal-stage circulator to the two-stage circulator to the two-way splitter to the donor antenna;
 transmitting wireless transmissions from the second wireless communications device by routing a signal to the two-stage circulator to the second single-stage circulator to the two-way splitter to the donor antenna; and
 forwarding wireless reception at the donor antenna from the two-way splitter to the first wireless communications device and/or the second wireless communications device.

21. The method of claim 20, further comprising receiving wireless transmissions at the first wireless device by routing a signal from the donor antenna to the two-way splitter to the second single-stage circulator to the first single-stage circulator to the first wireless communications device.

22. The method of claim 20, further comprising receiving wireless transmissions at the second wireless device by routing a signal from the donor antenna to the two-way splitter to the two-stage circulator to the second wireless communications device.

23. The method of claim 20, further comprising:
 pre-tuning a first radio frequency (RF) feedline between the two-stage circulator and the second single-stage circulator; and
 pre-tuning a second radio frequency (RF) feedline disposed between the first single-stage circulator and the second single-stage circulator.

24. The method of claim 20, wherein the first wireless communications device comprises a second transmission-reception path that is coupled to a service antenna.

25. The method of claim 20, further comprising performing Operations, Administration, Maintenance & Provisioning (OAM&P) between the first and the second wireless communications devices.

26. The method of claim 20, wherein the first and the second wireless communications devices use the same wireless data communications network.

27. The method of claim 20, wherein the first and the second wireless communications devices comprise a base station each, and each base station is configured to operate on different channels while transmitting-receiving over the donor antenna.

* * * * *

UNITED STATES PATENT AND TRADEMARK OFFICE
CERTIFICATE OF CORRECTION

| | | |
|---|---|---|
| PATENT NO. | : 8,369,268 B2 | Page 1 of 1 |
| APPLICATION NO. | : 12/614010 | |
| DATED | : February 5, 2013 | |
| INVENTOR(S) | : Rausch | |

It is certified that error appears in the above-identified patent and that said Letters Patent is hereby corrected as shown below:

Column 9:
Line 31 (claim 20, line 19), delete "signal-stage" and insert -- single-stage --.

Signed and Sealed this
Ninth Day of April, 2013

Teresa Stanek Rea
*Acting Director of the United States Patent and Trademark Office*